United States Patent [19]
Legler

[11] 3,959,813
[45] May 25, 1976

[54] GENERATION OF A SWITCHING SIGNAL FOR THE CHROMA KEYING OF COLOR VIDEO SIGNALS

[75] Inventor: Ernst Legler, Seeheim, Germany

[73] Assignee: Robert Bosch G.m.b.H., Stuttgart, Germany

[22] Filed: Nov. 20, 1974

[21] Appl. No.: 525,476

[30] Foreign Application Priority Data
Dec. 8, 1973  Germany............................ 2361269

[52] U.S. Cl............................... 358/22; 178/DIG. 6
[51] Int. Cl.²......................................... H04N 5/22
[58] Field of Search................... 358/22; 178/DIG. 6

[56] References Cited
UNITED STATES PATENTS

| | | | |
|---|---|---|---|
| 3,371,160 | 2/1968 | Hurford | 178/7.1 |
| 3,678,182 | 7/1972 | Boxman et al. | 358/22 |
| 3,778,542 | 12/1973 | Hanseman | 358/22 |

Primary Examiner—Robert L. Griffin
Assistant Examiner—R. John Godfrey
Attorney, Agent, or Firm—Littlepage, Quaintance, Murphy & Dobyns

[57] ABSTRACT

Generation of a switching signal for the chroma keying of color video signals, in which generation the voltage level of the switching signal becomes a maximum for a selected hue. The switching signal corresponds, when an adjustable voltage level is exceeded, to a specific color saturation of the selected hue. This generation is carried out by means of a first and a second color difference signal derived from primary signals of a color signal source, and by means of a sine-shaped and cosine-shaped variable control signal, the variation of which is a function of the angle of the selected hue in a color spectrum. In this generation, the first color difference signal is multiplied by the sine-shaped control signal, and the second color difference signal is multiplied by the cosine-shaped control signal, and the multiplied signals are added to a first signal component.

9 Claims, 5 Drawing Figures

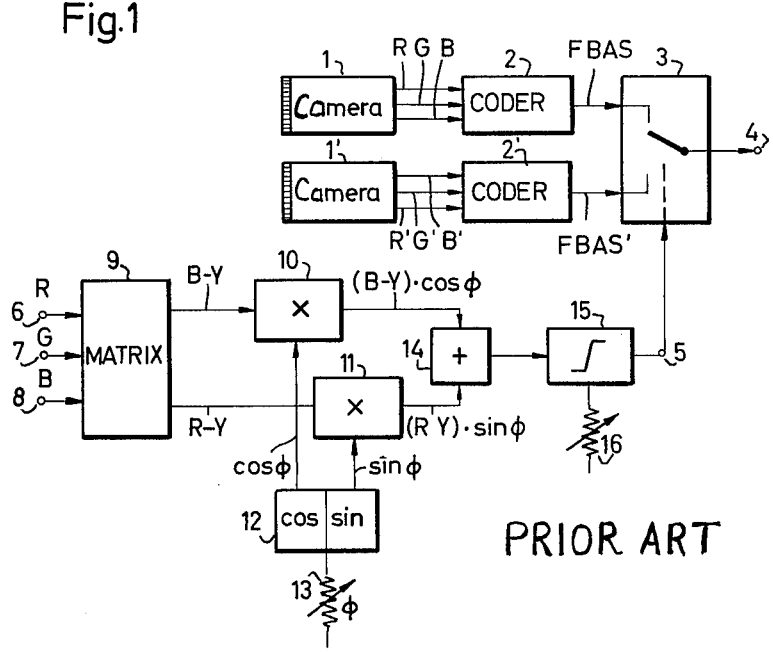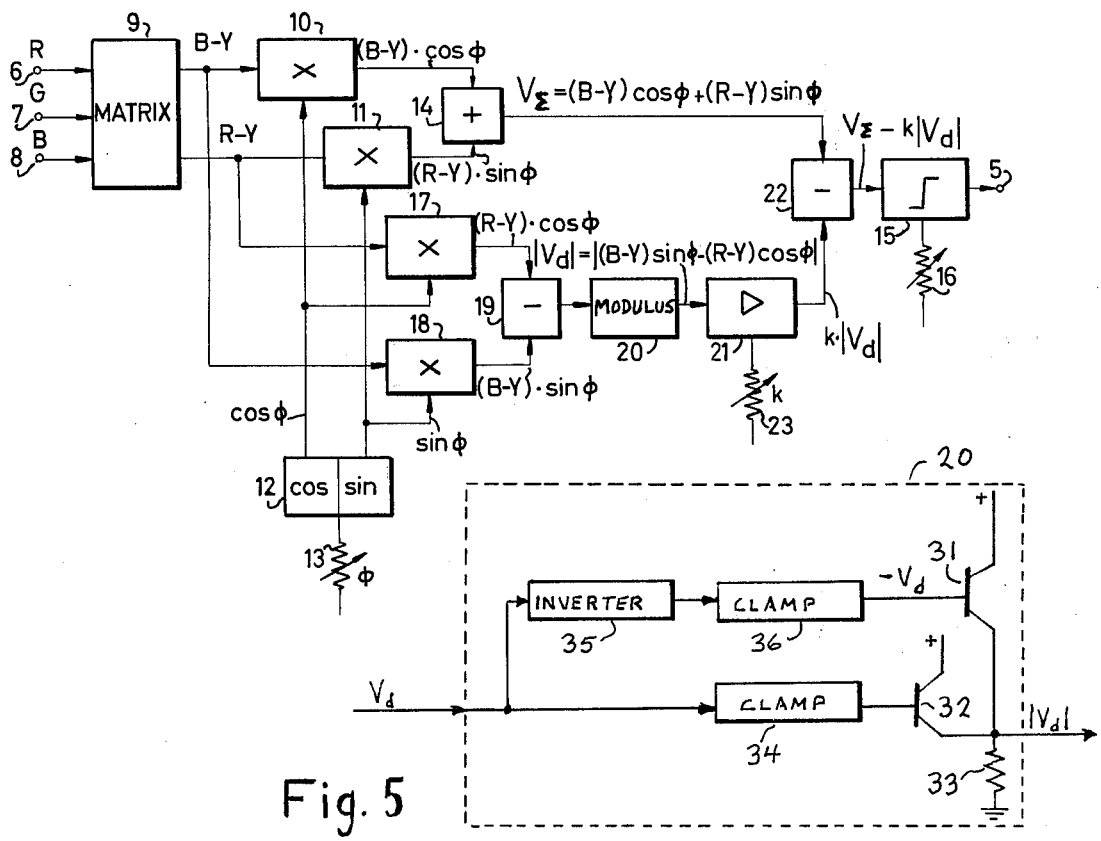

3,959,813

GENERATION OF A SWITCHING SIGNAL FOR THE CHROMA KEYING OF COLOR VIDEO SIGNALS

BACKGROUND OF THE INVENTION

1. Field of the Invention

The invention relates to generation of switching signals for the chroma keying of color video signals.

2. Description of the Prior Art

Chroma keying methods for background blending or trick mixing in color television studios are known per se. In a known method, the so-called self controlled chroma keying method, the control of a switch is carried out by means of a switching signal in such a manner that a foreground scene in front of, for instance, a blue background, is taken with high color saturation, and the occurrence of a color signal with a high blue content serves as criterion for the actuation of the switch. The foreground scene must in this case contain no "highly saturated" blue.

From British Pat. No. 1,189,552, a remotely controlled circuit arrangement for the chroma keying of color video signals is known. This circuit arrangement for chroma keying supplies a switching signal at the occurrence of the selected hue. The switching signal is produced by means of two automatic volume-control amplifiers and an adding circuit. The automatic volume-control amplifiers are continuously adjustable by means of a sine-shaped and cosine-shaped signal, so that any hue in the color signal of a color video source can be selected. When the amplitude of the selected hue exceeds a set threshold value, an electronic switch is actuated which switches the operation, for instance, from one television camera to another one. When, on the other hand, the amplitude of the selected color drops below the set threshold value, the original camera is reconnected by the switch.

This known method, however, presents the disadvantage that hues deviating from the selected hue neighboring color tones generate a switching signal when the amplitude of the selected hue is small, that is to say, when the selected hue exhibits only a small color saturation, and the threshold value must be set at a corresponding low value. Thus, e.g. in a selected hue "blue", the fully saturated mixed colors cyanic and purple with 50% of the total amplitude of blue are contained. In order to increase the hue selection of such a known circuit arrangement, it has already been proposed to feed to one input of an AND gate a signal component of the value $(B-M) \sin x - (R-M) \cos x$, and to another input of the AND gate a signal component of the value $(B-M) \cos x + (R-M) \sin x$, in which values $x$ corresponds to the hues corresponding to 0° – 360° in color spectrum. The AND gate furnishes an output signal only when both signals are negative. At $x = 0°$, the resulting values are $-(-R-M)$ and $(B-M)$. This means in the present case that, in a coordinate system with a $(R-M)$ axis and a $(B-M)$ axis, colors in the yellow-red quadrant become negative and will therefore be keyed out. By this measure, to be sure, the color selection is increased, but adjacent colors in the quadrant of the selected hues will, when the threshold value of the selected hue is set at a low level, continue to influence the switching signal.

The present invention therefore provides a method for generating a switching signal for the chroma keying of color signals of the type initially mentioned, in which method the color selection is increased. Furthermore, the hue selection is independent of the set degree of color saturation.

According to the invention, to set a hue-selection degree which is independent of the hue selected, a second signal component with adjustable amplitude is subtracted from the first signal component. In this process, the second signal component for the selected hue equals zero and differs from zero with respect to the adjacent colors.

In one embodiment of the invention, the first color difference signal is multiplied by the cosine-shaped control signal, and the second color difference signal is multiplied by the sine-shaped control signal. These multiplied signals are subtracted from each other and constitute, after the corresponding value is formed, a second signal component. Furthermore, the second signal component with adjustable amplitude is subtracted from the first signal component. The signal thus produced is supplied to a threshold value switch.

In a further development of the invention, the second signal component is formed such that the subtracted multiplied signals that differ from the subtracted multiplied signals by opposite signs are mixed in a non-additive manner at the same blanking level.

The invention now allows the degree of hue selection to be chosen independently of the hue set. This is accomplished because the second signal component for the selected hue itself becomes always zero. An amplitude change of the second signal component therefore affects only adjacent hues.

BRIEF DESCRIPTION OF THE DRAWINGS

The method of the invention will be explained in detail below with the aid of figures which represent embodiments and in which only the elements necessary for comprehension of the invention are shown in the drawings. Identical elements shown in the figures are provided with the same reference symbols.

FIG. 1 is a block diagram corresponding to British Pat. No. 1,189,552.

FIG. 2 is a block diagram according to the invention.

FIG. 5 illustrates device 20 in greater detail.

DECRIPTION OF THE PREFERRED EMBODIMENTS

Figure 3:
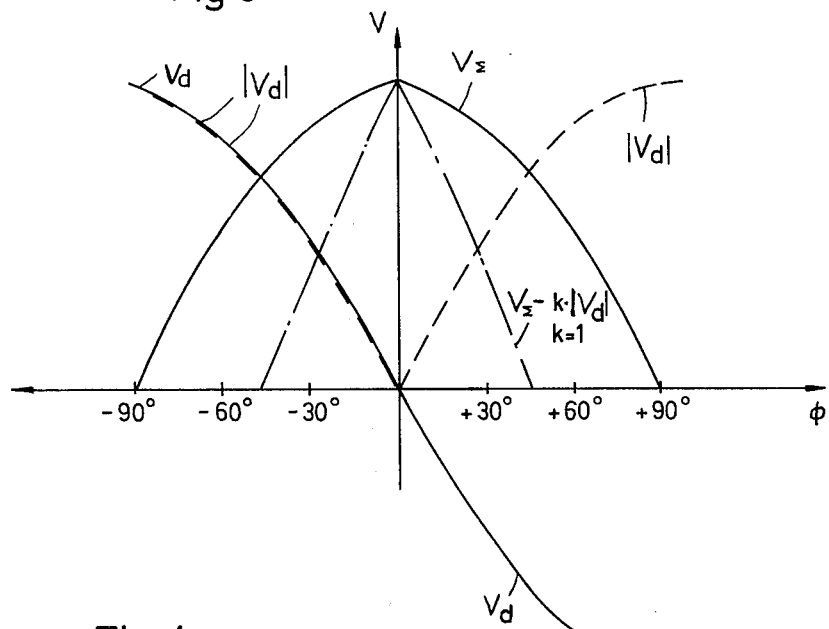
FIG. 3 illustrates diagrams for the explanation of the method of the invention.

In FIG. 1, a color television camera 1 represents a first color signal source, and a color television camera 1' represents a second color signal source. Color television camera 1 produces primary signals, R, G, and B, and color television camera 1', primary signals R', G', and B'. A coder 2 and 2', respectively, is assigned to each camera 1 and 1', respectively. Coders 2 and 2' generate a standard color video signal FBAS or FBAS' respectively. The term FBAS is taken from the first letters of the German words Farb-, Bild-, Austast- and Synchronsignal, meaning color, picture, blanking, and synchronizing signals. The FBAS color video signal and FBAS' are each fed to a respective input of an electronic cheangeover switch 3. At output terminal 4 of electronic switch 3 is supplied either a color video signal FBAS or FBAS', depending on the control of the contact path. The contact path of electronic changeover switch 3 is controlled by a switch signal at terminal 5. This switch signal is produced from primary signals produced, for example, by camera 1'. Primary signals R, G and B are fed to a matrix 9 by way of terminals 6, 7, and 8. Matrix 9 derives two color difference signals B−Y and R−Y. The color difference signal B−Y is fed to a first input of a first multiplying stage 10, and the color difference signal R−Y is fed to a first input of a second multiplying stage 11. In a stage 12, two control signals are produced which represent direct voltages, varying in magnitude and sign as a function of an adjustable angle of rotation $\phi$ such as cos $\phi$ and sin $\phi$. An adjusting element 13 continuously regulates the amplitudes of the control signals corresponding to a sine function or cosine function, respectively. The range of regulation of adjusting element 13 corresponds to angles $\phi$ from 0 to 360° of a selected hue in the color spectrum. The cosine control signal cos $\phi$ is fed to a second input of multiplying stage 10, at whose output the product (B−Y)cos $\phi$ is supplied. Correspondingly, the sine control signal is fed to a second input of multiplier stage 11. At the output of multiplier stage 11 a signal (R−Y)sin $\phi$ is supplied. The two products (B−Y)cos $\phi$ and (R−Y)sin $\phi$ are then each fed to an input of an adding stage 14 by means of which the products are added linearly, so as to form the term (B−Y)cos $\phi$ + (R−Y)sin $\phi$. This term represents a first signal component which is fed to a threshold value switch 15. Depending on the setting of the voltage threshold by means of adjusting element 16, threshold value switch 15 acts when the voltage level of the signal component is exceeded and furnishes at output terminal 5 a switch signal for controlling electronic changeover switch 3.

This known system of FIG. 1, however, does not assure sufficient hue selection. Colors adjacent to a selected hue may, in the case of a sufficient color saturation, likewise bring about a through-connection of threshold value switch 15 when the voltage threshold is set at a low level, and thus cause the release of a switching FIG. 2 is a block diagram according to the invention, for generating a switching signal for the chroma keying of color video signals, in which the degree of the color selection with respect to adjacent hues can be set at will. A part of this block diagram according to FIG. 2 corresponds to the block diagram according to FIG. 1. By way of terminals 6, 7 and 8, primary signals R, G and B are again fed to matrix 9 in which color difference signals B−Y and R−Y are produced. These color difference signals are multiplied with the cosine and sine control signals in the multiplier stages 10 and 11 and then are linearly added in adding stage 14, so that at the output of adding stage 14 the first signal component $V_\Sigma$ = (B−Y)cos $\phi$ + (R−Y)sin $\phi$ is supplied.

In addition, the color difference signal R−Y is multiplied in a multiplier stage 17 by the cosine control signal of stage 12, and the color difference signal B−Y is multiplied in a multiplier stage 18 by the sine control signal. Therefore the product (R−Y) cos $\phi$ is supplied at the output of multiplier stage 17, and the product (B−Y)sin $\phi$ is supplied at the output of multiplier stage 18. The two products are then subtracted from each other in a subtracting stage 19 and are fed to a device 20 for forming the resulting value. At the output of the device 20 for forming the resulting value, a signal of the function /$V_d$/ =/(B−Y)sin $\phi$− (R−Y)cos $\phi$ / is supplied, which is fed by way of a regulable amplifier 21 to a first input of a subtracting stage 22. By means of an adjusting element 23, the damping factor $k$ of the regulable amplifier 21 is adjusted. At the output of regulable amplifier 21, a second signal component of the function $k/V_d/$ is thus supplied. The second signal component $k/V_d/$ is subtracted, by means of subtracting stage 22 from the first signal component $V_\Sigma$ and is fed to the threshold value switch 15, at whose output terminal 5 the switching signal for the control of electronic switch 3 is supplied.

The signal component $V_\Sigma$ has a maximum at the selected hue and drops to about 50% at a distance of ± 60°. In the known method according to FIG. 1 strongly saturated adjacent colors may release a switching signal. By the subtraction of the second signal component $V_d$, the hue selection is greatly improved. This second signal component equals zero in the case of the selected hue and, at a distance of ± 90° from the selected hue, reaches its maximum, which may be positive or negative. By the formation of the resulting value, the negative component of $V_d$ is reflected around the zero axis toward the positive side. The degree of hue selection, that is the relation of the selected hue to the adjacent hues, can be set by means of the adjusting element 23 so that hues adjacent to the selected hue can be more or less strongly reduced at will. With respect to the selected hue, the signal amplitude remains unaffected by the setting of the selection.

FIG. 3 shows the curves for voltages $V_\Sigma$ , $V_d$, /$V_d$/ and $V_\Sigma$ −$k$/$U_d$/. The curve $V_\Sigma$ corresponds to the hue selection for $k$ = 0, which corresponds to the circuit arrangement of FIG. 1. The curve for $k$ = 1 shows clearly the improvement of the hue selection, and it is obvious that the effect is even substantially increased when $k$ > 1.

Figure 4:
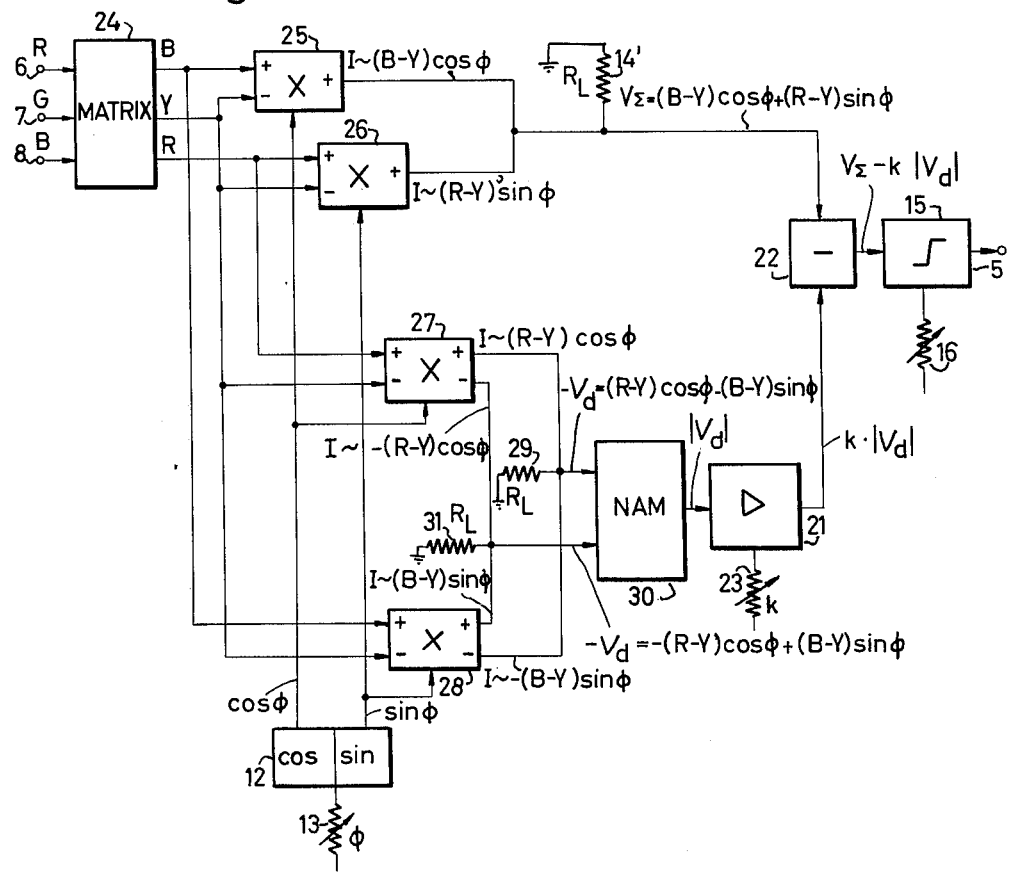
FIG. 4 illustrates a further development of the block diagram of FIG. 2.

An advantageous further development of the method of the invention according to FIG. 2 is shown in FIG. 4. Here too, primary signals of a color signal source are fed, by way of terminals 6, 7, and 8, to a matrix 24. This matrix 24 differs from matrix 9 in FIG. 2 in that what are derived are not color difference signals but the primary signals B and R and a luminance signal Y. The derivation of the color difference signals and the multiplication thereof with the cosine and sine control signals is carried out in multiplying stages with differential inputs, which are known per se. Such multiplying stages with differential inputs are, e.g., double push-pull modulators of the MC 1596 type, which supply output currents in two polarities. The primary signal B is fed to the non-inverting input of such a multiplier stage 25, and the luminance signal Y, to the inverting input. These signals are multiplied in multiplier stage 25 by the cosine control signal of stage 12, so that at the output a signal current of the value ($1/R_L$) (B−Y)cos $\phi$ is supplied.

The same process applies to the difference formation and multiplication of primary signal R and luminance signal Y by the sine control signal in multiplier stage 26, at whose output a signal current of the value ($1/R_L$) (R−Y)sin $\phi$ is supplied. These two multiplied signal currents are then, by parallel connection of the outputs, linearly added to produce at a common ballast resistor ($R_L$) 14' a signal of the value $V_S$ = (B−Y)cos $\phi$ + (R−Y)sin $\phi$ as a first signal component.

Furthermore, by means of a multiplier stage 27, color difference signal R−Y is formed and multiplied by the cosine control signal. At the outputs of multiplying stage 27, a signal current of the value ($1/R_L$) (R−Y)cos $\phi$ and a signal current of the value − ($1/R_L$) (R−Y)cos $\phi$ are alternately supplied. Primary signal B and luminance signal Y are multiplied, after the difference has been formed, by the sine control signal in multiplier stage 28, at whose outputs signal currents of the value $(1/R_L)(B-Y)\sin\phi$ and $-(1/R_L)(B-Y)\sin\phi$ originate. The signal currents $(1/R_L)(R-Y)\cos\phi$ and $-(1/R_L)(B-Y)\sin\phi$ are added in a common ballast resistor 29, and are fed as $+V_d$ to a first input of a non-additive mixer stage (NAM) 30. In the same manner the signal currents $-(1/R_L)(R-Y)\cos\phi$ and $(1/R_L)(B-Y)\sin\phi$ are added in a common ballast resistor 31' and are fed as $-V_d$ to a second input of the non-additive mixer stage 30. Non-additive mixer stages are known from the periodical "Journal of SMPTE, Vol. 73 (1964), pages 658 to 660. Non-additive mixer stages always connect to the output at each instant, out of two input signals, only that input signal which has the greatest amplitude of a specific polarity. With respect to the non-additive mixer stage 30, this means that in the mixer stage the modulus of one of the two input signals $+V_d = (R-Y)\cos\phi - (B-Y)\sin\phi$ or $-V_d = -(R-Y)\cos\phi + (B-Y)\sin\phi$ is formed. The further processing of signal $/V_d/$ takes place as in the manner described in FIG. 2. First the signal $/V_d/$ is fed, by way of an adjustable regulable amplifier 21, to a first input of subtraction stage 22. From the first signal component V the second signal component $k/V_d/$ is subtracted and fed, as a signal of the value $V - k/V_d/$, to threshold value switch 15 at whose output terminal 5, the switching signal for the chroma keying of color video signals is supplied.

Elements 20 of FIG. 2 is illustrated in greater detail in FIG. 5. The signal $V_d = (B-Y)\sin\phi - (R-Y)\cos\phi$ consists of two vectors, a first vector $(B-Y)\sin\phi$ and a second vector $(R-Y)\cos\phi$. Mathematically a vector is characterized by a specific magnitude and a specific phase. The vector modulus $/V_d/ = /(B-Y)\sin\phi - (R-Y)\cos\phi/$ is pictured by the signal $V_d = (B-Y)\sin\phi - (R-Y)\cos\phi$ as the output of element 20. In U.S. Pat. 3,371,160, one such NAM element is illustrated. In FIG. 5, element 20, the signal $V_d$ is conveyed to a non-additive mixer (NAM) stage 31, 32 and 33 after the signal has first been clamped by a first clamp stage 34. The signal is conveyed to a second input of the NAM stage after polarity reversal in inverter 35 and clamping in clamping stage 36.

What is claimed is:

1. In an apparatus for generating a switching signal for chroma keying of color video signals, wherein the switching signal attains a maximum value when a video signal exhibits a preselected hue, the switching signal exceeding a preselected threshold value when said preselected hue attains a preselected saturation, comprising:
   A. matrix means for receiving primary-color video signals,
   B. first multiplier means responsive to the matrix means for deriving a first multiplied signal which is proportional to a first color difference, taken from the primary color video signals, multiplied by a cosine function of an angular variable value of the preselected hue in a color spectrum,
   C. second multiplier means responsive to the matrix means for deriving a second multiplied signal which is proportional to a second color difference multiplied by a sine function of said angular variable value, and
   D. adding means for adding the first and second multiplied signals together to form a first signal component,
      the improvement for allowing the degree of hue selection to be set independently of the hue selected, comprising:
   E. third multiplier means for generating a third multiplier signal proportional to said first color difference multiplied by said sine function,
   F. fourth multiplier means for generating a fourth multiplied signal proportional to said second color difference multiplied by said cosine functions,
   G. means for additively combining the third and fourth multiplied signals with opposite polarities to form thereby a second signal component,
   H. means for selectively adjusting the absolute magnitude of the second signal component, and
   I. means for subtracting from the first signal component the adjusted absolute magnitude of the second signal component to generate said switching signal, wherein the second signal component equals zero for the preselected hue and differs from zero for colors adjacent to the preselected hue.

2. A method according to claim 1 wherein the primary-color video signals are the signals R, G, and B, the first color difference is proportional to $B-Y$, and the second color difference is proportional to $R-Y$, in which $Y = 0.30R + 0.59G + 0.11B$.

3. Apparatus according to claim 1 further comprising:
   A. threshold means responsive to said switching signal for operation whenever said switching signal exceeds said preselected threshold value.

4. Apparatus according to claim 1, wherein the primary-color video signals are the signals R, G, and B, the first color difference is proportional to $B-Y$, and the second color difference is proportional to $B-Y$, in which $Y = 0.30R + 0.59G + 0.11B$.

5. Apparatus according to claim 1, wherein the first and second multiplier means are multipliers with differential input terminals for receipt of signals respectively representative of the first and second color differences.

6. Apparatus according to claim 1, wherein the first and second multiplier means are multipliers which each provide two output signals of respectively positive and negative polarity.

7. Apparatus according to claim 1, wherein the first and second multiplier means are double push-pull modulators.

8. In a method for generating a switching signal for the chroma keying of color video signals, wherein the switching signal attains a maximum value when a video signal exhibits a preselected hue, the switching signal exceeding a preselected threshold value when said preselected hue attains a preselected saturation, comprising the steps of:
   A. receiving primary-color video signals,
   B. deriving a first multiplied signal which is proportional to a first color difference, taken from the primary-color video signals, multiplied by a cosine function of an angular variable value of the preselected hue in a color spectrum,
   C. deriving a second multiplied signal which is proportional to a second color difference, taken from the primary-color video signals, multiplied by a sine function of said angular variable value, and
   D. adding the first and second multiplied signals together to form a first signal component, the improvement for allowing the degree of hue selection to be set independently of the hue selected, comprising the further steps of:

E. generating a third multiplied signal proportional to said first color difference multiplied by said sine function, F. generating a fourth multiplied signal proportional to said second color difference multiplied by said cosine function, G. additively combining the third and fourth multiplied signals with opposite polarities to form thereby a second signal component, H. selectively adjusting the absolute magnitude of the second signal component, and I. subtracting from the first signal component the adjusted absolute magnitude of the second signal component to generate said switching signal, wherein the second signal component equals zero for the preselected hue and differs from zero for colors adjacent to the preselected hue.

9. A method according to claim 8 further comprising:

A. operating a switch whenever said switching signal exceeds said preselected threshold value.

* * * * *

UNITED STATES PATENT AND TRADEMARK OFFICE
CERTIFICATE OF CORRECTION

PATENT NO. : 3,959,813
DATED : May 25, 1976
INVENTOR(S) : Ernst Legler

It is certified that error appears in the above–identified patent and that said Letters Patent are hereby corrected as shown below:

Column 5, line 26, delete "V" and insert $--V_\Sigma--$, line 28, delete "V $-k/V_d/$", and insert $--V_\Sigma-k/V_d/--$.

Column 6, line 37, delete "B-Y" and insert --R-Y--.

Signed and Sealed this

Ninth Day of November 1976

[SEAL]

Attest:

RUTH C. MASON
*Attesting Officer*

C. MARSHALL DANN
*Commissioner of Patents and Trademarks*